No. 735,991. Patented August 11, 1903.

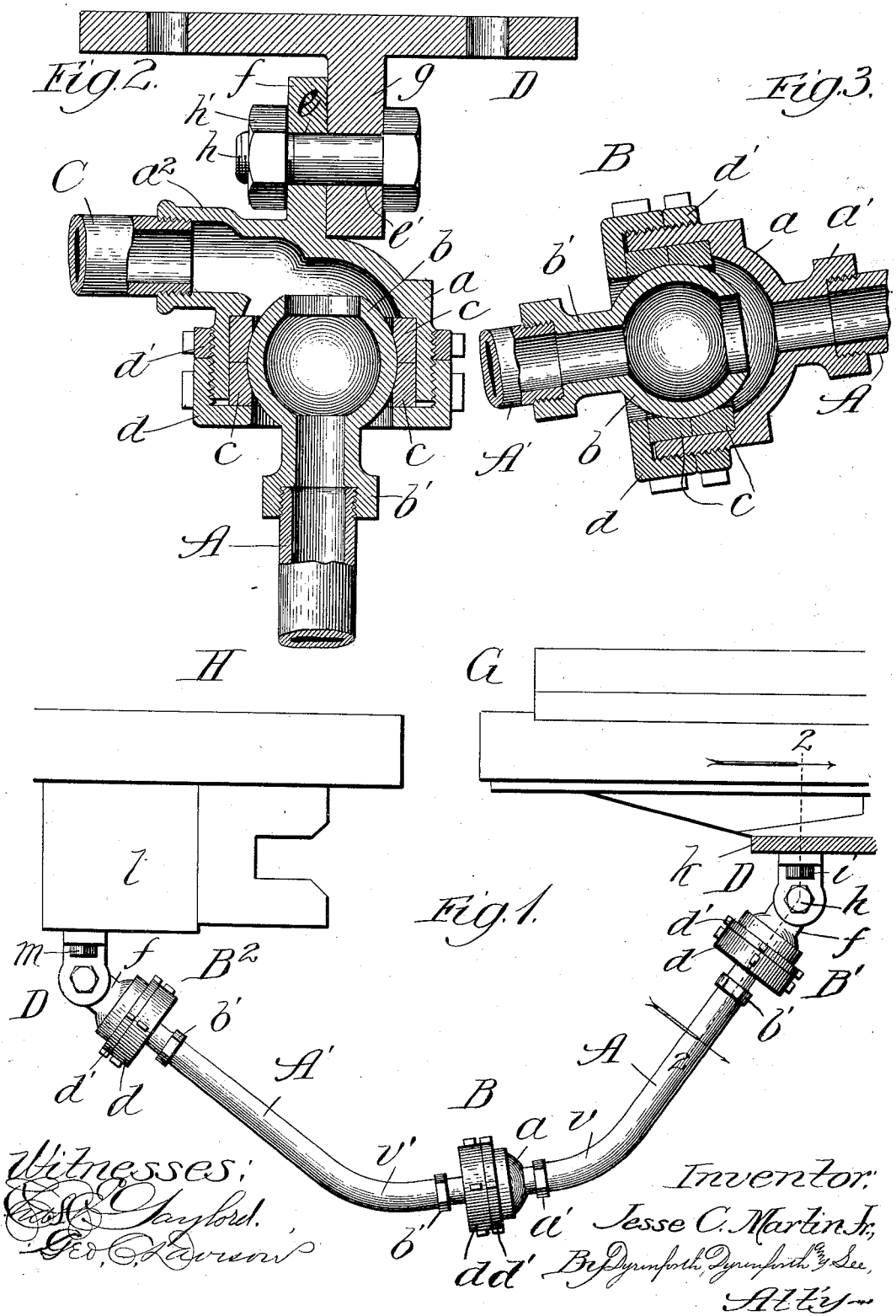

UNITED STATES PATENT OFFICE.

JESSE C. MARTIN, JR., OF SAN FRANCISCO, CALIFORNIA.

TRAIN-PIPE COUPLING.

SPECIFICATION forming part of Letters Patent No. 735,991, dated August 11, 1903.

Application filed December 15, 1902. Serial No. 135,230. (No model.)

*To all whom it may concern:*

Be it known that I, JESSE C. MARTIN, Jr., a citizen of the United States, residing at San Francisco, in the county of San Francisco and State of California, have invented a new and useful Improvement in Train-Pipe Couplings, of which the following is a specification.

My invention relates to an improvement in the class of substitute between car-couplings for the rubber-hose means more commonly employed for coupling the fluid-conducting pipes between cars in a train; and it relates particularly to an improvement in the class of couplings referred to employed where requirement for uncoupling is infrequent, as between a locomotive and its tender.

The object of my invention is to provide, for the stated situation, a tubular metal coupling containing ball-and-socket joints to render it adequately flexible and which may be set to center the balls of the joints under the various normal conditions (such as the relative heights of the locomotive and tender) to which the setting may have to be adapted, thereby to avoid injurious strain upon the joints by affording to all of them a uniform extent of deflection under the sinuous movements to which the coupling is subjected in its position.

Referring to the accompanying drawings, Figure 1 shows my improved coupling by a view in side elevation adjusted in its operative position between a locomotive and its tender, of which only the rear and front ends, respectively, are represented. Fig. 2 is a section taken at the line 2 2 on Fig. 1 viewed in the direction of the arrow and enlarged, and Fig. 3 a vertical central section taken lengthwise through the middle joint in the coupling of Fig. 1 and enlarged.

A and A' are the metal tubes of the coupling, slightly curved at adjacent ends, as shown at $v$ and $v'$, where they are flexibly connected by a ball-and-socket joint B. This joint may involve any suitable construction, but the preferred construction is that illustrated in Fig. 3, comprising the socket $a$, having a nipple $a'$, into which the tube A is screwed, the ball $b$, having a nipple $b'$, into which the tube A' is screwed, the ball being confined in the socket, within a gasket $c$ therein, by a cap $d$, screwed upon the socket, provided with a lock-nut $d'$. At their outer ends the tubes A and A' are respectively screwed into the nipples of the ball portions $b$ of ball-and-socket joints B' and B², which, as shown, are in all particulars like the joint B, except that the socket-nipple on each (shown at $a^2$ in Fig. 2) extends at a right angle to the socket to engage with the threaded end of a train-pipe section connected by the coupling, one of which sections is shown at C. From the end of each socket of the end joints B' and B² there projects a rigid stem $f$, containing a pivot-bolt hole $e$. D is a head, shown of general T shape, having a hole $e'$ through its stem $g$ to coincide with the hole in the socket-stem $f$ for the purpose of admitting through the coincident holes a pivot-bolt $h$, carrying a nut $h'$, for adjustably fastening together the socket and head.

To apply my improved coupling in position between a locomotive (indicated at G in Fig. 1) and a tender, (indicated at H in the same figure,) the head D at one end is fastened under the locomotive, as to the "deck-plate" $k$, by tap-bolts $i$, and the head D at the opposite end is fastened under the tender, as to the front sill $l$, by lag-bolts $m$. With the coupling thus fastened in place and connecting the train-pipe sections it requires adjustment according to the difference in height from the track between the fastening-points on the locomotive and tender of the respective ends of the coupling, which is liable to vary in different locomotives and tenders. Thus if the fastening-point on the locomotive be higher than represented in Fig. 1 relative to that on the tender the position of the tube A will tend more toward the vertical than shown and that of the tube A' will accordingly tend more toward the horizontal. Obviously, then, under different conditions of the points of fastening the coupling, unless means were provided for avoiding it by adjustment, the sockets and balls of the several joints would be liable to occupy different relative angles, thereby decreasing the freedom of relative turning of the parts of one joint or the other below the extent of play required, so that wherever the extent of relative play in any direction required of the members of a joint under the sinuous movements of the locomotive and tender should exceed that of which they are capable the consequent strain would tend to impair and even break the joint. I avoid this by adjusting the coupling in its original setting to center the balls of all the joints in their sockets. Thus whatever may be the relative angles assumed by the tubes A and A' in the initial fastening of the coupling ends the ball of the middle joint may first be centered in its socket, then that in the joint at one end of the coupling may be turned on its pivot $h$ to center it in its socket and rigidly fastened in its set position by tightening the respective nut $h'$, and then the socket in the joint at the opposite end of the coupling may be turned on its pivot to center it and similarly fastened in its set position. With the several joints thus set to center the balls in their sockets the extent of play of the parts is rendered the same in all the joints and the primary object of my improvement is accomplished.

What I claim as new, and desire to secure by Letters Patent, is—

1. As a new article of manufacture, an interchangeable train-pipe coupling consisting of a plurality of tube-sections flexibly joined together, a socket flexibly joined to the outer end of each tube-section and provided with an integral apertured stem, a securing-head at each socket provided with an integral apertured stem, a bolt passed through the apertures of said stems to afford a swiveled connection between the socket and head, and a tightening-nut on said bolt.

2. As a new article of manufacture, an interchangeable train-pipe coupling consisting of a plurality of ball-and-socket joined tube-sections each tube-section being curved toward its inner end to bring the ball of said joint normally centrally of its seat, a socket flexibly joined to the outer end of each tube-section and provided with an integral apertured stem, a securing-head at each end socket provided with an integral apertured stem, a bolt passed horizontally through the apertures of said stems to afford a swiveled connection between the socket and head, and a tightening-nut on said bolt.

JESSE C. MARTIN, Jr.

In presence of—
CLARENCE I. BERRY,
D. B. RICHARDS.